United States Patent
Geiss (10) Patent No.: US 9,100,589 B1
(45) Date of Patent: *Aug. 4, 2015

(54) INTERLEAVED CAPTURE FOR HIGH DYNAMIC RANGE IMAGE ACQUISITION AND SYNTHESIS

(71) Applicant: Google Inc., Mountain View, CA (US)

(72) Inventor: Ryan Geiss, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/863,981

(22) Filed: Apr. 16, 2013

Related U.S. Application Data (63) Continuation of application No. 13/610,288, filed on Sep. 11, 2012, now Pat. No. 8,446,481.

(51) Int. Cl.
*H04N 5/265* (2006.01)
*H04N 5/235* (2006.01)

(52) U.S. Cl.
CPC .............. *H04N 5/265* (2013.01); *H04N 5/2355* (2013.01)

(58) Field of Classification Search
CPC .... H04N 5/2355; H04N 5/2356; H04N 5/243
USPC ................. 348/221.1, 229.1, 362–368, 218.1
See application file for complete search history.

(56) References Cited

U.S. PATENT DOCUMENTS

| | | |
|---|---|---|
| 4,644,582 A | 2/1987 | Morishita et al. |
| 5,781,308 A | 7/1998 | Fujii et al. |
| 5,828,793 A | 10/1998 | Mann |
| 5,926,190 A | 7/1999 | Turkowski et al. |
| 6,061,091 A | 5/2000 | Van de Poel et al. |
| 6,075,905 A | 6/2000 | Herman et al. |
| 6,101,285 A | 8/2000 | Fan |
| 6,204,881 B1 * | 3/2001 | Ikeda et al. ................... 348/362 |
| 6,539,116 B2 | 3/2003 | Takaoka |
| 6,693,718 B1 | 2/2004 | Takaoka |
| 6,925,121 B1 | 8/2005 | Komiya et al. |

(Continued)

FOREIGN PATENT DOCUMENTS

| | | |
|---|---|---|
| JP | 2005-045804 | 2/2005 |
| JP | 2012-029029 | 2/2012 |

(Continued)

OTHER PUBLICATIONS

Notice of Allowance for U.S. Appl. No. 13/610,288 mailed Feb. 28, 2013, 31 pages.

(Continued)

*Primary Examiner* — Mekonnen Dagnew
(74) *Attorney, Agent, or Firm* — McDonnell Boehnen Hulbert & Berghoff LLP (57) ABSTRACT

A computing device may capture a first image using a first exposure length. It may be determined that x pixels in the captured first image are properly-exposed and that y pixels in the captured first image are improperly-exposed. Based on the y improperly-exposed pixels, a second exposure length may be determined. A second image may be captured using the second exposure length. The second image may include y' pixels that correspond to the y improperly-exposed pixels in the first image. At least some of the x properly-exposed pixels from the first image may be combined with at least some of the y' pixels from the second image to form a composite image.

20 Claims, 7 Drawing Sheets

(56) References Cited

U.S. PATENT DOCUMENTS

| | | |
|---|---|---|
| 6,975,755 B1 | 12/2005 | Baumberg |
| 7,173,666 B1 | 2/2007 | Masaki et al. |
| 7,239,805 B2 | 7/2007 | Uyttendaele et al. |
| 7,626,614 B1 | 12/2009 | Marcu |
| 7,667,764 B2 | 2/2010 | Kamon et al. |
| 7,840,093 B2 | 11/2010 | Fu et al. |
| 7,903,168 B2 | 3/2011 | Pillman et al. |
| 7,924,321 B2 | 4/2011 | Nayar et al. |
| 7,940,325 B2 | 5/2011 | Kim et al. |
| 7,944,485 B2 | 5/2011 | Ovsiannikov |
| 8,023,004 B2 | 9/2011 | Asoma |
| 8,059,891 B2 | 11/2011 | Li et al. |
| 8,072,507 B2 | 12/2011 | Fuh et al. |
| 8,094,211 B2 | 1/2012 | Kwon et al. |
| 8,200,020 B1 | 6/2012 | Geiss et al. |
| 8,208,048 B2 | 6/2012 | Lin et al. |
| 8,237,813 B2 | 8/2012 | Garten |
| 8,411,962 B1 | 4/2013 | Geiss et al. |
| 8,446,481 B1 | 5/2013 | Geiss et al. |
| 2001/0019362 A1 | 9/2001 | Nakamura et al. |
| 2003/0002750 A1 | 1/2003 | Ejiri et al. |
| 2003/0095192 A1 | 5/2003 | Horiuchi |
| 2004/0160525 A1 | 8/2004 | Kingetsu et al. |
| 2005/0147322 A1 | 7/2005 | Saed |
| 2005/0163380 A1 | 7/2005 | Wang et al. |
| 2005/0239104 A1 | 10/2005 | Ferea et al. |
| 2005/0243176 A1 | 11/2005 | Wu et al. |
| 2006/0259155 A1 | 11/2006 | Kitahara |
| 2006/0291740 A1 | 12/2006 | Kim et al. |
| 2007/0003261 A1 | 1/2007 | Yamasaki |
| 2007/0147824 A1 | 6/2007 | Hamamura |
| 2008/0253758 A1 | 10/2008 | Yap et al. |
| 2008/0278633 A1 | 11/2008 | Tsoupko-Sitnikov et al. |
| 2008/0298717 A1 | 12/2008 | Lee |
| 2009/0040364 A1 | 2/2009 | Rubner |
| 2009/0123082 A1 | 5/2009 | Atanssov et al. |
| 2009/0185622 A1 | 7/2009 | Itoh et al. |
| 2009/0207258 A1 | 8/2009 | Jang et al. |
| 2009/0222625 A1 | 9/2009 | Ghosh et al. |
| 2009/0231445 A1 | 9/2009 | Kanehiro |
| 2009/0231449 A1 | 9/2009 | Tzur et al. |
| 2009/0231468 A1 | 9/2009 | Yasuda |
| 2009/0244301 A1 | 10/2009 | Border et al. |
| 2009/0268963 A1 | 10/2009 | Kang et al. |
| 2009/0274387 A1 | 11/2009 | Jin |
| 2009/0322901 A1* | 12/2009 | Subbotin et al. ........... 348/229.1 |
| 2010/0066858 A1 | 3/2010 | Asoma |
| 2010/0103194 A1 | 4/2010 | Chen et al. |
| 2010/0150473 A1 | 6/2010 | Kwon et al. |
| 2010/0157078 A1 | 6/2010 | Atanassov et al. |
| 2010/0165075 A1 | 7/2010 | Chou et al. |
| 2010/0166337 A1 | 7/2010 | Murashita et al. |
| 2010/0265357 A1 | 10/2010 | Liu et al. |
| 2010/0321539 A1 | 12/2010 | Ito |
| 2010/0328490 A1 | 12/2010 | Kurane et al. |
| 2010/0328491 A1 | 12/2010 | Ovsiannikov |
| 2011/0047155 A1 | 2/2011 | Sohn et al. |
| 2011/0085697 A1 | 4/2011 | Clippard et al. |
| 2011/0149111 A1 | 6/2011 | Prentice et al. |
| 2011/0200265 A1 | 8/2011 | Prigent |
| 2011/0228993 A1 | 9/2011 | Reilly et al. |
| 2011/0254976 A1 | 10/2011 | Garten |
| 2011/0279706 A1 | 11/2011 | Lesiak et al. |
| 2012/0002082 A1 | 1/2012 | Johnson et al. |
| 2012/0002898 A1 | 1/2012 | Cote et al. |
| 2012/0002899 A1 | 1/2012 | Orr, IV et al. |
| 2012/0044381 A1 | 2/2012 | Jannard et al. |
| 2012/0105681 A1 | 5/2012 | Morales |
| 2012/0127348 A1 | 5/2012 | Li |
| 2012/0189197 A1 | 7/2012 | Li et al. |
| 2012/0201426 A1 | 8/2012 | Jasinski et al. |
| 2012/0201450 A1 | 8/2012 | Bryant et al. |
| 2012/0201456 A1 | 8/2012 | El-Mahdy et al. |
| 2012/0219235 A1 | 8/2012 | Solhusvik et al. |
| 2012/0249828 A1 | 10/2012 | Sun |
| 2012/0314100 A1 | 12/2012 | Frank |
| 2013/0033616 A1 | 2/2013 | Kaizu et al. |
| 2013/0083216 A1* | 4/2013 | Jiang et al. ................. 348/223.1 |
| 2013/0100314 A1 | 4/2013 | Li et al. |
| 2014/0042233 A1 | 2/2014 | Yang |
| 2014/0219578 A1 | 8/2014 | Peng et al. |
| 2014/0347521 A1* | 11/2014 | Hasinoff et al. .............. 348/239 |

FOREIGN PATENT DOCUMENTS

| | | |
|---|---|---|
| KR | 10-2007-0085867 | 8/2007 |
| KR | 10-0911814 | 8/2009 |
| KR | 10-2010-0086987 | 8/2010 |
| WO | 98/02844 | 1/1998 |
| WO | 2004/098167 | 11/2004 |
| WO | 2011/093994 | 8/2011 |
| WO | 2011/102850 | 8/2011 |
| WO | 2012/027290 | 3/2012 |
| WO | 2012/039669 | 3/2012 |
| WO | 2012/061261 | 5/2012 |
| WO | 2012/098842 | 7/2012 |
| WO | 2012/110894 | 8/2012 |

OTHER PUBLICATIONS

Notice of Allowance for U.S. Appl. No. 13/305,389 mailed Feb. 22, 2012, 9 pages.

Notice of Allowance for U.S. Appl. No. 13/458,334 mailed Oct. 11, 2012, 34 pages.

Bauer et al., "Comparing Several Implementations of Two Recently Published Feature Detectors," In Proc. of the International Conference on Intelligent and Autonomous Systems, IAV, Toulouse, France (2007).

Bay et al., "SURF: Speeded Up Robust Features," 9th European Conference on Computer Vision, 2008, pp. 346-359, vol. 110, No. 3.

Brown, M. & Lowe, D., "Invariant Features from Interest Point Groups," Computer, (2002) p. 253-262, Available at: http://citeseerx.ist.psu.edu/viewdoc/download?doi=10.1.1.73.5616&rep=rep1&type=pdf.

Cyganek, Bogustaw, "Comparison of nonparametric transformations and bit vector matching for stereo correlation." Combinatorial Image Analysis, 2005, pp. 534-547.

Fife, Wade S. et al., "Improved Census Transforms for Resource-Optimized Stereo Vision," IEEE Transactions on Circuits and Systems for Video Technology, Jan. 2013, vol. 23, No. 1, pp. 60-73.

Gelfand, Natasha, et al. "Multi-exposure imaging on mobile devices." In Proceedings of the international conference on Multimedia, ACM, 2010, pp. 823-826.

Hansen, Christian et al., "Chapter 1: The Image Deblurring Problem," Deblurring Images: Matrices, Spectra, and Filtering, SIAM, Philadelphia, 2006, pp. 1-12.

Karpenko et al., "Digital Video Stabilization and Rolling Shutter Correction using Gyroscopes," Stanford Tech Report CTSR Mar. 2011, http://graphics.stanford.edu/papers/stabilization/karpenko_gyro.pdf (Sep. 2011).

Lowe, D.G., "Object Recognition from Local Scale-Invariant Features," Proc. of the International Conference on Computer Vision, Sep. 20-22, 1999, pp. 1150-1157, vol. 2.

Özuysal et al., "Fast Keypoint Recognition in Ten Lines of Code," Computer Vision and Pattern Recognition, IEEE Computer Society Conference on in Computer Vision and Pattern Recognition, 2007. CVPR '07. IEEE Conference on, vol. 0 (2007), pp. 1-8. doi:10.1109/CVPR.2007.383123 Key: citeulike:2943111.

Seemann, Torsten et al., "Structure preserving noise filtering of images using explicit local segmentation." Fourteenth International Conference on Pattern Recognition, IEEE, 1998, vol. 2, pp. 1610-1612.

SIFT, accessed on Oct. 21, 2011, from Wikipedia, http://en.wikipedia.org/w/index.php?title=Special:Book&bookcmd=download&collection_id=1bf75abdad524091&writer=rl&return_to=Scale-invariant+feature+transform.

Sinha et al., "Feature Tracking and Matching in Video Using Programmable Graphics Hardware," Machine Vision and Applications, DOI 10.1007/s00138-007-0105-z, Nov. 2007.

(56) References Cited

OTHER PUBLICATIONS

SURF, accessed on Oct. 24, 2011, from Wikipedia, http://en.wikipedia.org/wiki/SURF.
SynthCam iPhone, https://sites.google.com/site/marclevoy/Tutorial accessed Oct. 24, 2011.
Ta, Duy-Nguyen et al., "SURFTrac: Efficient Tracking and Continuous Object Recognition using Local Feature Descriptors," IEEE Computer Society Conference on Computer Vision and Pattern Recognition, 2009, pp. 2937-2944.
Wagner et al., "Pose Tracking from Natural Features on Mobile Phones," Proceeding ISMAR '08 Proceedings of the 7th IEEE/ACM International Symposium on Mixed and Augmented Reality IEEE Computer Society Washington, DC, USA, Sep. 15-18, 2008, pp. 125-134.
Wagner et al., "Real-time detection and tracking for augmented reality on mobile phones," IEEE Trans Vis Comput Graph, May-Jun. 2010, pp. 355-368, vol. 16, No. 3.
Winder, S.A.J. and Brown, M., "Learning Local Image Descriptors," Computer Vision and Pattern Recognition, 2007. CVPR '07. IEEE Conference on in Computer Vision and Pattern Recognition, 2007. CVPR '07. IEEE Conference on (Jun. 2007), pp. 1-8. doi:10.1109/CVPR.2007.382971 Key: citeulike:1663569.
Zabih et al., "Non-parametric Local Transforms for Computing Visual Correspondence," In Proceedings of European Conference on Computer Vision, Stockholm, Sweden, May 1994, pp. 151-158.
Duan et al., "Tone-mapping High Dynamic Range Images by Novel Histogram Adjustment," Pattern Recognition, 2010, 39 pages, vol. 43, No. 5.
"Exposure (photography)," Wikipedia, the free encyclopedia, Jun. 21, 2012, pp. 1-8 (http://en.wikipedia.org/wiki/Autoexposure#Automatic_exposure).
"High dynamic range imaging," Wikipedia, the free encyclopedia, Jun. 21, 2012, pp. 1-11 (http://en.wikipedia.org/wiki/High_dynamic_range_imaging).
International Searching Authority, International Search Report and Written Opinion for PCT/US2013/071618 mailed Mar. 3, 2014, 9 pages.
International Searching Authority, International Search Report and Written Opinion for PCT/US2013/072569 mailed Mar. 6, 2014, 9 pages.
"JPEG," Wikipedia, the free encyclopedia, Jul. 31, 2012, pp. 1-16 (http://en.wikipedia.org/wiki/JPEG).
"Metering mode," Wikipedia, the free encyclopedia, Jun. 25, 2012, pp. 1-3 (http://en.wikipedia.org/wiki/Metering_mode).
Nayar et al., "Adaptive Dynamic Range Imaging: Optical Control of Pixel Exposures Over Space and Time," Proceedings of the Ninth IEEE International Conference on Computer Vision (ICCV'03), 2003, pp. 1-8.
"Tone mapping," Wikipedia, the free encyclopedia, Jun. 21, 2012, pp. 1-10 (http://en.wikipedia.org/wiki/Tone_mapping).
"YCbCr," Wikipedia, the free encyclopedia, Jul. 31, 2012, pp. 1-5 (http://en.wikipedia.org/wiki/YCbCr).
International Searching Authority, International Search Report and Written Opinion for PCT/US2013/072638 mailed Mar. 11, 2014, 10 pages.
International Searching Authority, International Search Report and Written Opinion for PCT/US2013/071663 mailed Mar. 13, 2014, 9 pages.
International Searching Authority, International Search Report and Written Opinion for PCT/US2013/72564 mailed Mar. 11, 2014, 13 pages.
International Searching Authority, International Search Report and Written Opinion for PCT/US2013/071459 mailed Mar. 13, 2014, 9 pages.
International Search Report and Written Opinion for PCT/US2014/011498 mailed Apr. 22, 2014, 11 pages.
Jin et al., "Face Detection Using Improved LBP Under Bayesian Framework," Proceedings of the Third International Conference on Image and Graphics (ICIG'04), 2004, pp. 1-4.
Mandava et al., "Speckle Noise Reduction Using Local Binary Pattern," 2nd International Conference on Communication, Computing & Security (ICCCS-2012), Procedia Technology, 2012, pp. 574-581, vol. 6.
Office Action for U.S. Appl. No. 13/743,565 mailed Sep. 4, 2014, 20 pages.
Office Action for U.S. Appl. No. 13/722,519 mailed Sep. 4, 2014, 10 pages.
Office Action for U.S. Appl. No. 13/759,749 mailed Sep. 24, 2014, 38 pages.
International Searching Authority, International Search Report and Written Opinion for International Application No. PCT/US2014/038963 mailed Sep. 17, 2014, 12 pages.
Office Action for U.S. Appl. No. 13/718,533 mailed Apr. 22, 2014, 48 pages.
Notice of Allowance for U.S. Appl. No. 13/718,533 mailed Jul. 18, 2014, 9 pages.
Notice of Allowance for U.S. Appl. No. 13/713,720 mailed Jul. 18, 2014, 13 pages.
Notice of Allowance for U.S. Appl. No. 13/743,565 mailed Dec. 2, 2014, 15 pages.
Notice of Allowance for U.S. Appl. No. 14/455,444 mailed Oct. 2, 2014, 9 pages.
Office Action for U.S. Appl. No. 13/902,254 mailed Dec. 2, 2014, 9 pages.
Office Action for U.S. Appl. No. 13/902,267 mailed Dec. 12, 2014, 12 pages.
Office Action for U.S. Appl. No. 13/849,824 mailed Nov. 5, 2014, 14 pages.
Office Action for U.S. Appl. No. 13/713,720 dated Apr. 8, 2014, 20 pages.

* cited by examiner

INTERLEAVED CAPTURE FOR HIGH DYNAMIC RANGE IMAGE ACQUISITION AND SYNTHESIS

BACKGROUND

Low dynamic range (LDR) imaging may refer to representing the brightness of captured digital images (e.g., photographs and motion video) with 8 or fewer bits per pixel. As a result, up to 256 levels of brightness may be supported. Currently, a wide range of video output devices (e.g., computer monitors, tablet and smartphone screens, televisions, etc.) support displaying LDR images.

However, real-world scenes often exhibit a wider range of brightness than can be represented by LDR imaging. As an example scene with a wide brightness range, consider an individual standing in a dark room in front of a window. This scene may include both extremely bright regions (e.g., sunlit features outside the window) and extremely dark regions (e.g., the features in the room). Ideally, a photograph of this scene would include both the details in the bright regions and the details in the dark regions.

SUMMARY

In a first example embodiment, a first image may be captured using a first exposure length. It may be determined that x pixels in the captured first image are properly-exposed and that y pixels in the captured first image are improperly-exposed. Based on the y improperly-exposed pixels, a second exposure length may be determined. A second image may be captured using the second exposure length. The second image may include y' pixels that correspond to the y improperly-exposed pixels in the first image. At least some of the x properly-exposed pixels from the first image may be combined with at least some of the y' pixels from the second image to form a composite image.

In a second example embodiment, a sequence of m paired images may be captured. The first image of each ith pair may be captured using a respective exposure length of e(i), and x(i) pixels in the first image of the ith pair may properly-exposed while y(i) pixels in the first image of the ith pair may be improperly-exposed. The second image in the ith pair may be captured using a respective exposure length of f(i), that may be based on pixel values of the y(i) improperly-exposed pixels in the first image of the ith pair. The second image in the ith pair may include y'(i) pixels that correspond to the y(i) improperly-exposed pixels in the first image of the ith pair. At least some of the x(m) properly-exposed pixels from the first image of the mth pair may be combined with at least some of the y'(m) pixels from the second image in the mth pair to form a composite image.

A third example embodiment may include a non-transitory computer-readable storage medium, having stored thereon program instructions that, upon execution by a computing device, cause the computing device to perform operations in accordance with the first and/or second example embodiments.

A fourth example embodiment may include a computing device, comprising at least a processor and data storage. The data storage may contain program instructions that, upon execution by the processor, cause the computing device to operate in accordance with the first and/or second example embodiments.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

As image capture devices, such as cameras, become more popular, they may be employed as standalone hardware devices or integrated into various other types of hardware devices. For instance, still and video cameras are now regularly included in wireless communication devices (e.g., mobile phones), tablet computers, laptop computers, video game interfaces, home automation devices, and even automobiles and other types of vehicles.

The physical components of a camera may include an aperture through which light enters, a recording surface for capturing the image represented by the light, and a lens positioned in front of the aperture to focus at least part of the image on the recording surface. The aperture may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

A shutter may be coupled to or nearby the lens or the recording surface. The shutter may either be in a closed position, in which it blocks light from reaching the recording surface, or an open position, in which light is allowed to reach to recording surface. The position of the shutter may be controlled by a shutter button. For instance, the shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened" the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more photographs being recorded, regardless of how the shuttering process is triggered or controlled.

The exposure of a captured image may be determined by a combination of the size of the aperture, the brightness of the light entering the aperture, and the length of the shutter cycle (also referred to as the shutter length or the exposure length). Additionally, a digital or analog gain may be applied to the image, thereby influencing the exposure. In some embodiments, the term "total exposure length" or "total exposure time" may refer to the shutter length multiplied by the gain for a particular aperture size. Herein, the term "exposure length" should be interpreted as possibly being the shutter length, the total exposure length, or some other metric that controls the amount of signal response that results from light reaching the recording surface.

A still camera may capture one or more images each time image capture is triggered. A video camera may continuously capture images at a particular rate (e.g., 24 frames per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured.

Cameras—even analog cameras—may include software to control one or more camera functions and/or settings, such as aperture size, exposure length, gain, and so on. Additionally, some cameras may include software that digitally processes images during or after these images are captured.

Figure 1:
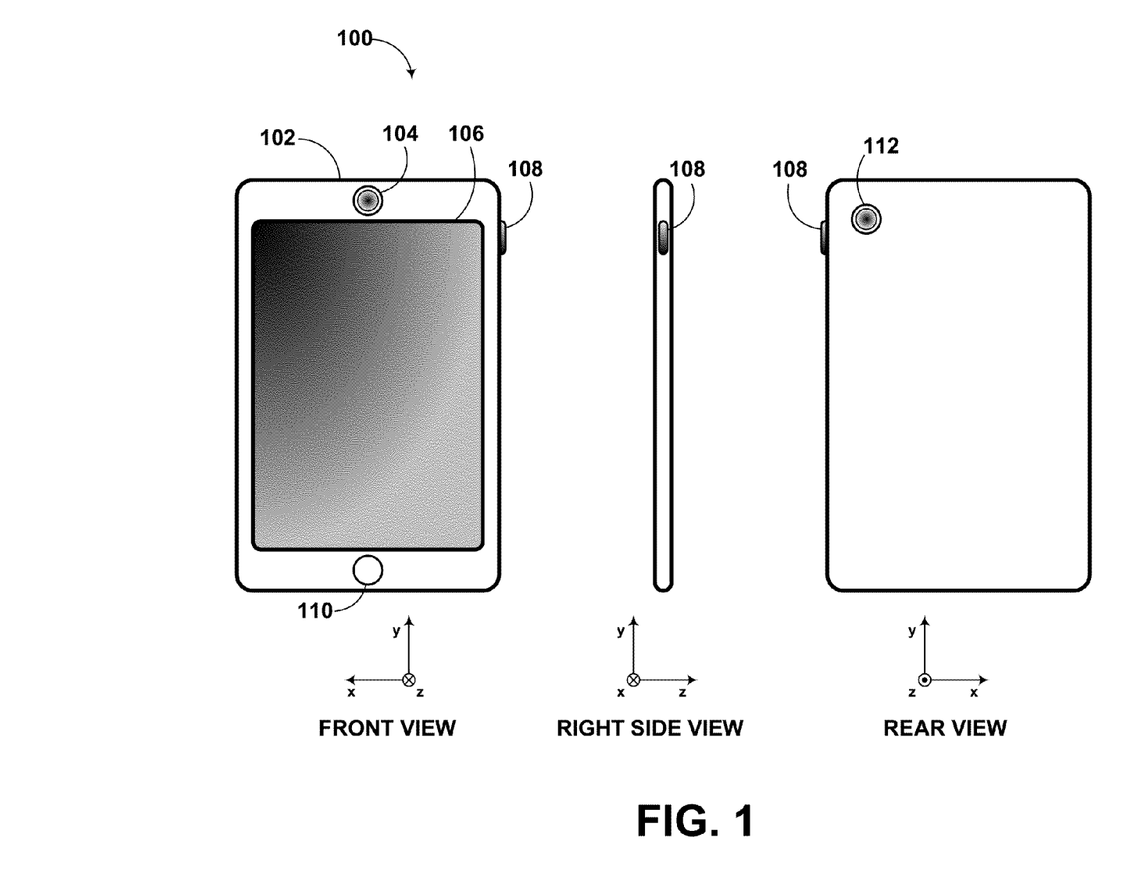
FIG. 1 depicts front, right side, and rear views of a digital camera device, in accordance with an example embodiment.

While it should be understood that the description above refers to cameras in general, it may be particularly relevant to digital cameras. As noted previously, digital cameras may be standalone devices or integrated with other devices. As an example, FIG. 1 illustrates the form factor of a digital camera device 100.

Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include a rear-facing camera 112. Front-facing camera 104 may be positioned on a side of body 102 typically facing a user while in operation, or on the same side as multi-element display 106. Rear-facing camera 112 may be positioned on a side of body 102 opposite front-facing camera 104. Referring to the cameras as front and rear facing is arbitrary, and digital camera device 100 may include multiple cameras positioned on various sides of body 102.

Multi-element display 106 could represent a cathode ray tube (CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or rear-facing camera 112, or an image that could be captured or was recently captured by either or both of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 may be similarly or differently arranged. Additionally, front-facing camera 104, rear-facing camera 112, or both, may be an array of cameras.

Either or both of front facing camera 104 and rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front facing camera 104 and rear-facing camera 112 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine an exposure length of an associated camera, or to help in this determination.

Digital camera device 100 could be configured to use multi-element display 106 and either front-facing camera 104 or rear-facing camera 112 to capture images of a target object. The captured images could be a plurality of still images or a video stream. The image capture could be triggered by activating shutter button 108, pressing a softkey on multi-element display 106, or by some other mechanism. Depending upon the exact embodiment, the images could be captured automatically at a specific time interval, upon pressing shutter button 108, upon appropriate lighting conditions of the target object, upon moving digital camera device 100 a predetermined distance, or according to a different predetermined capture schedule.

As noted above, the functions of digital camera device 100—or another type of digital camera—may be integrated into a computing device, such as a wireless communication device, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a camera application operating in software on a particular physical hardware platform, or other combinations of hardware and software that are configured to carry out camera functions.

Figure 2:
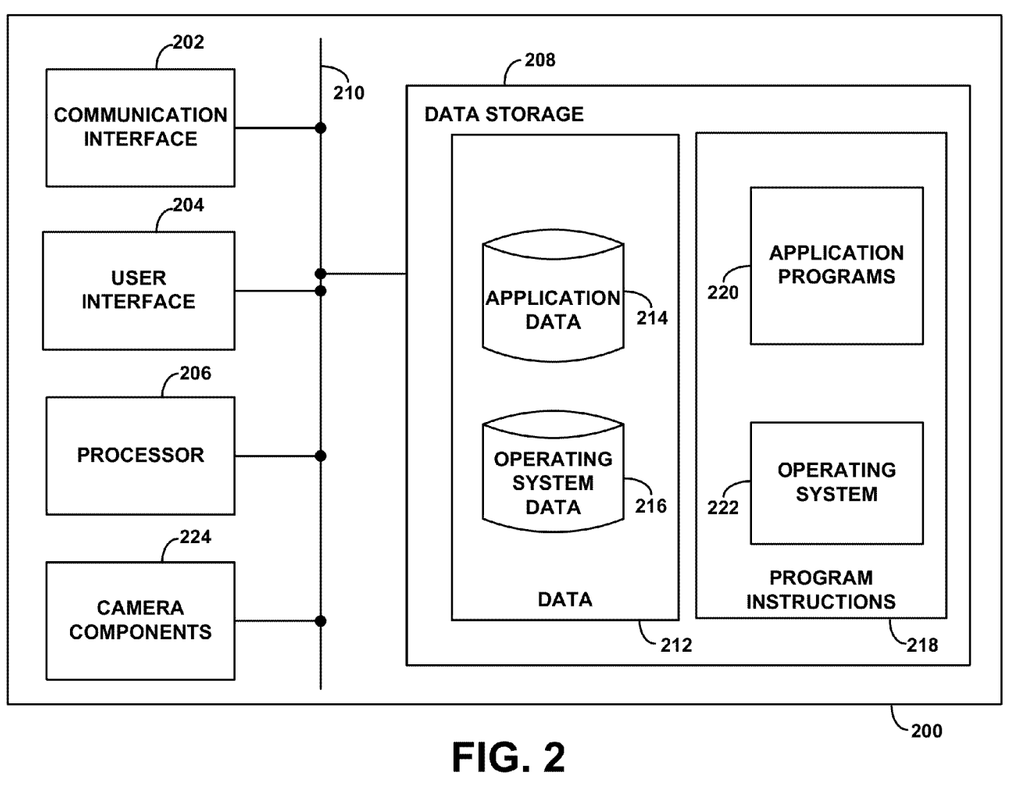
FIG. 2 depicts a block diagram of a computing device with image capture capability, in accordance with an example embodiment.

As shown in FIG. 2, computing device 200 may include a communication interface 202, a user interface 204, a processor 206, data storage 108, and camera functions 224, all of which may be communicatively linked together by a system bus, network, or other connection mechanism 210.

Communication interface 202 functions to allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., taking a picture). It may be possible that some or all of these buttons, switches, knobs, and/or dials are implemented as functions on a presence-sensitive panel.

Processor 206 may comprise one or more general purpose processors (e.g., microprocessors) and/or one or more special purpose processors—e.g., digital signal processors (DSPs), graphics processing units (GPUs), floating point units (FPUs), network processors, or application-specific integrated circuits (ASICs). Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or functions disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface, lens, and/or shutter button. Camera components 224 may be controlled at least in part by software executed by processor 206.

Captured digital images may be represented as a one-dimensional, two-dimensional, or multi-dimensional array of pixels. Each pixel may be represented by one or more values that may encode the respective pixel's color and/or brightness. For example, one possible encoding uses the YCbCr color model. In this color model, the Y channel may represent the brightness of a pixel, and the Cb and Cr channels may represent the blue chrominance and red chrominance, respectively, of the pixel. For instance, each of these channels may take values from 0 to 255. Thus, the brightness of a pixel may be represented by a 0 or a value near zero if the pixel is black or close to black, and by a 255 or a value near 255 if the pixel is white or close to white. However, the value of 255 is a non-limiting reference point, and some implementations may use different maximum values (e.g., 1023, 4095, etc.).

Nonetheless, the YCbCr color model is just one possible color model, and other color models such as a red-green-blue (RGB) color model or a cyan-magenta-yellow-key (CMYK) may be employed with the embodiments herein. Further, the pixels in an image may be represented in various file formats, including raw (uncompressed) formats, or compressed formats such as Joint Photographic Experts Group (JPEG), Portable Network Graphics (PNG), Graphics Interchange Format (GIF), and so on.

Some pixel encodings—including the YCbCr color model—use 8 bits to represent the brightness of each pixel. Doing so is referred to as LDR imaging. As a result, only 256 levels of brightness may be supported. However, real-world scenes often exhibit a wider dynamic range of brightness than can be reasonably represented by LDR imaging. For example, a scene of an individual standing in a dark room in front of a window may include both extremely bright regions and extremely dark regions. However, use of LDR imaging to capture an image of such a scene may result in loss of detail in the bright region and/or the dark region based on the exposure length with which the image was captured.

A short exposure length may result in a reasonably accurate representation of the bright regions of a scene, but underexposure of the dark regions. Conversely, a long exposure length may result in a reasonably accurate representation of the dark regions, but may overexpose the bright regions. In the example scene, if the exposure length is too long, the features in the room may appear properly-exposed, but the features outside the window may appear whitewashed. But if the exposure length is too short, the features outside the window may appear normal but the features in the room may appear darkened. Either of these outcomes is undesirable. For some scenes, there may not be a single exposure length that results in a captured image representing the details in both bright regions and dark regions with acceptable detail.

Camera devices may support an auto-exposure (AE) mode in which, prior to final image capture, the camera determines the exposure length based on the brightness of the scene. For example, the user may observe the scene in the camera's viewfinder before triggering image capture. During this period, the camera may make an initial estimate of the proper exposure length, capture a preview image with that exposure length, and then evaluate the pixels in the captured image. If a majority of the pixels in the preview image are over-exposed, the camera may decrease the exposure length and capture another preview image. If a majority of the pixels in this preview image are under-exposed, the camera may increase the exposure length and capture yet another preview image.

For instance, if the majority of the pixels in the captured image exhibit a brightness value above a high threshold level (e.g., 240), the camera may decrease the exposure length. On the other hand, if a sufficient fraction (e.g., a majority) of the pixels exhibit a brightness level below a low threshold level (e.g., 96), the camera may increase the exposure length.

Alternatively or additionally, a target average value for some or all of the scene's pixels may be determined. If the actual average pixel value is above the target average value, the exposure length may be decreased, and if the actual average pixel value is below the target average value, the exposure length may be increased. The target average value can also be tuned differently depending on how much contrast there is in the scene. For example, in a low-contrast scene, the target average value may be bright (e.g., 200). But in a high-contrast scene, the target average value may be lower (e.g., 128).

This process may continue until the camera determines that an image should be captured and stored (e.g., the user activates the shutter button). During this process, if the characteristics of the scene are relatively unchanging, the camera usually converges on an estimated "best" exposure length based on the brightness of the scene.

In some cases, the camera might not weight all pixels equally when determining an "average" brightness of the scene. Pixels near the middle of the scene may be considered to be more important and thus given a higher weight than some pixels in other areas of the scene. Alternatively, pixels in other locations may be given more weight. For instance, if the camera detects a human face (or some other object of interest) in a particular location of a scene, the camera may give a higher weight to the associated pixels.

In this way, AE algorithms may seek to determine an exposure length that produces a large number (e.g., the largest number) of properly-exposed pixels. However, given the range limitations of LDR imaging, even images captured in AE mode may contain portions that are whitewashed or darkened. For some scenes there may be no single "best" exposure length.

It should be noted that AE algorithms may differ from the description above. For instance, some may be more complex, treating different colors differently, considering the spatial and/or structural components of a scene, and/or measuring contrast between regions. The embodiments herein, however, may operate with any AE algorithm now known or developed in the future.

High dynamic range (HDR) imaging has been proposed as a way of compensating for the deficiencies of LDR imaging. In a possible implementation, HDR image acquisition involves a camera taking multiple LDR images of a scene at various exposure lengths, and then digitally post-processing these captured images to make a single image that contains a reasonable representation of the details in all regions of the scene, including those that are very bright and very dark.

The resulting single image may represent color brightness with as many as 12-16 bits, which is far beyond the dynamic range that is viewable on conventional video output devices. In order to reduce the dynamic range down to the 8-bit range that is displayable on a conventional video output device, tone mapping may be used. Tone mapping includes various techniques of determining how to represent a larger dynamic range of colors and levels of brightness on a medium that supports a smaller dynamic range. Some of these techniques may take into account how colors and brightness are perceived in the human brain to preserve the contrast, but not necessarily the exact colors intensities, of neighboring regions of the image. Generally, tone mapping techniques attempt reduce the overall dynamic range within an image to facilitate display of HDR images on devices with a lower dynamic range.

Regardless, one of the challenges of HDR image acquisition is to determine (i) how many LDR images to capture, (ii) at what exposure lengths, and (iii) at what delay between captures. If images with of a scene on motion are captured over a long enough period of time, HDR reassembly of these images may result in "ghosting" or motion blur of objects in the image.

One possible improvement to HDR imagining involves capturing two interleaved sequences of images. For instance, one sequence may be referred to as the "A sequence" and the other sequence may be referred to as the "B sequence." Images captured as part of the A sequence may referred to as "A images," and images captured as part of the B sequence may be referred to as "B images." In some implementations, each B image may be captured after a corresponding A image is captured, but before the next A image in the A sequence is captured. Thus, each A image may be pairwise associated with a respective B image. However, other relationships between images in the A and B sequences may be possible. If a B image is captured quickly after its corresponding A image is captured, ghosting effects may be reduced or eliminated. Thus, pairs of images consisting of an A image and a B image may be captured back to back or within a few milliseconds of each other.

The A sequence may operate according to an AE algorithm, referred to as the "A algorithm." Thus, considering only A images, these A images may be captured with exposure lengths that are in accordance with such an AE algorithm. In particular, the A algorithm may seek one or more exposure lengths that maximize the number of pixels that are properly-exposed in the A images. The B sequence, however, may operate according to a different algorithm, referred to as the "B algorithm." For example, the B algorithm may be designed such that a particular B image is captured using an exposure length that attempts to properly expose only the subset of pixels that were improperly exposed in the previous A image.

Herein, a pixel is "properly-exposed" if its brightness value is within a pre-defined range. For 8-bit brightness values, this range might be, for instance, 32-224, 16-240, 96-240, 128-240 and so on. A pixel is "improperly-exposed" if its brightness value falls outside of this range (i.e., the pixel is either under-exposed or over-exposed). However, brightness values may be encoded using more or fewer bits, and the pre-defined range may be different than the example range given above.

Thus, in some embodiments, the exposure length for each B image may depend on the brightness values of pixels in the most recently-captured A image. However, the A algorithm may operate independently of the brightness values of pixels in the B images. Alternatively, the A algorithm may depend, to some extent, on these brightness values, or other characteristics, of one or more B images.

Eventually, the A algorithm may converge. This convergence may be defined as when either (i) more than 50% of the pixels in the A image being properly-exposed, or (ii) the exposure length used to capture A images stops changing. For example, the A algorithm may search for an exposure length that results in a majority (e.g., >50%) of the pixels being properly-exposed. Properly exposing the remaining pixels may be assumed to be handled by the B algorithm.

Even after the A algorithm converges, both the A algorithm and the B algorithm may continue operating. Thus, if the scene being captured changes (e.g., due to movement of the camera device or movement within the scene), the A algorithm and B algorithm can continue to adapt to any new information in the scene.

When image capture is triggered, the most recent images captured by the A and B algorithms may be combined. (Alternatively, the camera may capture two new images with the most recent respective total exposure lengths.) The combination of the images may involve positioning and/or merging the properly-exposed pixels of the A image with pixels from the B image that correspond to the under-exposed or over-exposed pixels of the A image. Thus, a resulting composite image may be formed, in which pixels that are improperly-exposed in the last A image are replaced by corresponding pixels (e.g., pixels from approximately the same locations) from the last B image. Alternatively, the most recent A and B images may be automatically combined, and triggering image capture may serve to select the most recent composite image.

Figure 3:
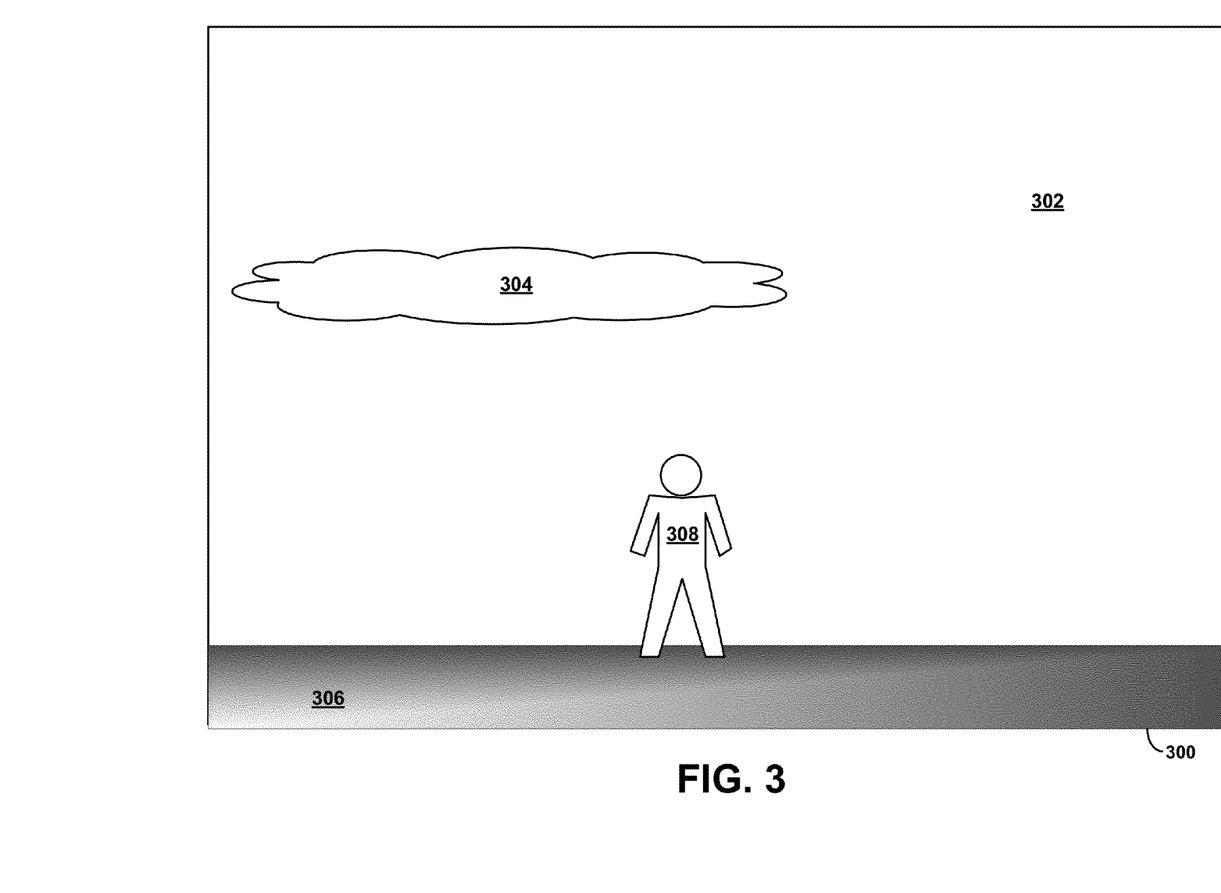
FIG. 3 depicts a scene, in accordance with an example embodiment.

As an example, consider FIG. 3 which depicts a scene 300 as viewed by the human eye. There are four main components in scene 300: (1) sky 302, (2) cloud 304 in sky 302, (3) ground 306, and (4) person 308 standing on ground 306. The dominant light source in scene 300 may be positioned behind person 308. In this example, sky 302 and cloud 304 are illuminated more brightly than ground 306 and person 308.

While human visual perception may accommodate for this range of brightness, LDR imaging may be unable to do so in an acceptable fashion. Consequently, captured images of scene 300 may result in sky 302 and cloud 304 being over-exposed and/or ground 306 or person 308 being under-exposed.

Figure 4:
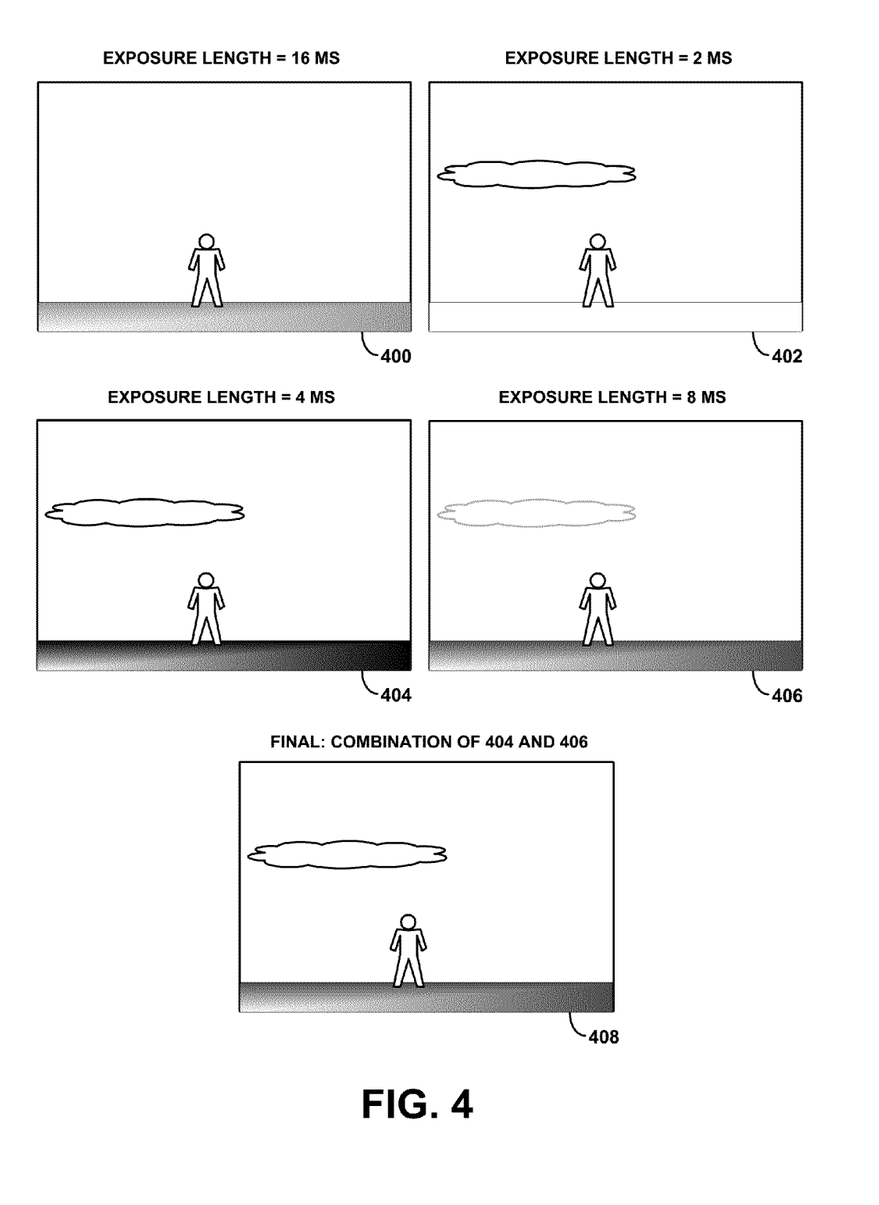
FIG. 4 depicts multiple captured images, in accordance with an example embodiment.

FIG. 4 depicts a series of images of scene 300 captured according to an example embodiment. Images 400 and 404 may be captured as part of the A sequence, and images 402 and 406 may be captured as part of the B sequence. Image 408 depicts a combination of images 404 and 406, the last images captured in each sequence.

Image 400, the first image in the A sequence, is taken with an exposure length of 16 milliseconds. This exposure length may be a default exposure length or may be dynamically determined. In some embodiments, the camera may be equipped with an ambient light sensor that may continuously or from time to time determine the brightness of a scene that the camera can capture. By using information from the ambient light sensor, the initial exposure length(s) may be adjusted based on the currently-determined or most-recently-determined brightness level. Doing so may reduce the time and/or number of iterations that the AE algorithm carries out before converging.

Regardless, in this instance, the 16 millisecond exposure length is too long. As a result, parts of image 400 are over-exposed. Cloud 304 is not discernible in sky 302, and sky 302 appears white or near-white. Additionally, ground 306 and person 308 appear whitewashed.

In preparation for taking the first image in the B sequence, the subset of over-exposed pixels of image 400 (e.g., the pixels representing sky 302 and cloud 304) may be considered. An exposure length that attempts to maximize the number of properly-exposed pixels in this subset may be selected, and then image 402 may be captured using this exposure length. In this example, a much shorter exposure length of 2 milliseconds may be selected. In the captured image 402, sky 302 and cloud 304 are reasonably well exposed, but person 308 and ground 306 are under-exposed.

In the next iteration of the A algorithm, a new exposure length is determined. This exposure length may be selected according to an AE algorithm and/or such that the next image in the A sequence is likely to contain more properly-exposed pixels than image 400. In this instance, an exposure length of 4 milliseconds is selected, and image 404 is captured using this exposure length. In image 404, sky 302 and cloud 304 are properly-exposed, but person 308 and ground 306 are under-exposed.

In preparation for taking the second image in the B sequence, the improperly-exposed pixels of image 404 may be considered. Thus, an exposure length may be selected that attempts to improve the exposure of person 308 and ground 306 in the second B image. In this instance, an exposure length of 8 milliseconds is selected, and image 406 is captured using this exposure length. In image 406, sky 302 and cloud 304 are over-exposed, but person 308 and ground 306 are properly-exposed.

Since more than 50% of the pixels in image 404 are proper-exposed, the A algorithm may converge, and the exposure length for the A algorithm may remain at 4 milliseconds. Consequently, the exposure length for the B algorithm may remain at 8 milliseconds. Once image capture is triggered, the final A image and the final B image (represented by image 404 and image 406, respectively) may be aligned and combined into a composite image (as noted previously, in alternate embodiments, this aligning and combining process may occur automatically, and triggering image capture may serve to select the most recent composite image).

Particularly, the properly-exposed pixels of the image 404 may be combined with pixels in the image 406 that correspond to improperly-exposed pixels in image 404. In other words, sky 302 and cloud 304 from image 404 may be combined with person 308 and ground 306 from image 406. The resulting composite image 408 represents the details of both the bright and dark regions of the scene reasonably well.

Combining pixels from captured images to form the composite image may be accomplished in a number of ways. For example, a pixel-by-pixel combination of images may be formed by assigning weights to the pixels of each image according to, for instance the brightness of the pixels. Then, depending on its weight, a particular pixel may be included or excluded from the final image. Alternatively, two or more LDR images may be combined into an HDR image, and the HDR image may then be tone mapped so that its brightness falls within a range commensurate with the display abilities of convention video output devices. However, other methods of combining pixels from captured images may be used instead for the embodiments herein.

While the A and B algorithms are operating, an image representing the scene may be displayed in the viewfinder of a camera device or a computing device. This image might be just the latest A image, or the latest B image. However, if the camera device or computing device has sufficient processing abilities, it may display a combined version of the latest A image and latest B image in the viewfinder.

It should be understood that the embodiments depicted in FIGS. 3 and 4 are mere examples. Other embodiments may involve different types of images, different exposure lengths and/or different A algorithms and B algorithms. Further, as depicted in FIG. 4, the A algorithm is the master (e.g., it ignores what the B algorithm is doing), and the B algorithm is the slave (e.g., its operation depends on the A images). As noted above, versions in which the two algorithms interdepend are also possible.

In some implementations, when one algorithm is the master, it may be advantageous to bias it toward attempting to properly-expose the darker or the brighter parts of the scene. In practice, it may be easier for the A algorithm to attempt to properly-expose the brighter parts. To understand why, imagine the opposite, where the A algorithm attempts to properly-expose the dark parts. In that case, other parts of the scene may be over-exposed (e.g., with brightness values at or near the maximum brightness value), but it may be difficult to determine the degree of over-exposure for these parts. For example, pixels that are over-exposed by 5% may exhibit similar brightness values as pixels that are over-exposed by 200%. Therefore, it may be difficult for the A algorithm to determine whether its exposure length should be adjusted.

Additionally, some embodiments may include a C algorithm associated with a "C sequence" of captured images. For example, after the ith A image and B images are captured, the ith C image may also be captured. The exposure length used for capturing the ith C image may be selected to attempt to properly-expose a part of the scene that is improperly-exposed in both the ith A image and the ith B image. Thus, the C algorithm may depend on the brightness values of pixels of both the previous A and B images. After image capture is triggered, the final A image, B image, and C image may be combined to form a composite image. Alternatively, the ith A image, B image, and C image may be combined automatically, and triggering image capture may select the latest composite image.

The composite image may include at least some of the properly-exposed pixels in the A image, at least some pixels from the B image that correspond to pixels that are improperly-exposed in the A image, and at least some pixels from the C image that correspond to pixels that are improperly-exposed in both the A image and the B image.

One possible scene in which it may be advantageous to include a C algorithm, in addition to the A and B algorithms discussed above, is that of a person in a cave. For instance, if the person is standing in the shade of the cave but there is sunlight illuminating the ground of the cave, there may be three distinct levels of exposure that can be used to properly-expose each of the person, the shaded portion of the cave, and the illuminated portion of the cave.

Additionally, any number of algorithms may be combined in this fashion, according to the embodiments herein. Thus, in some embodiments, there may be a D algorithm, D and E algorithms, and so on.

Figure 5:
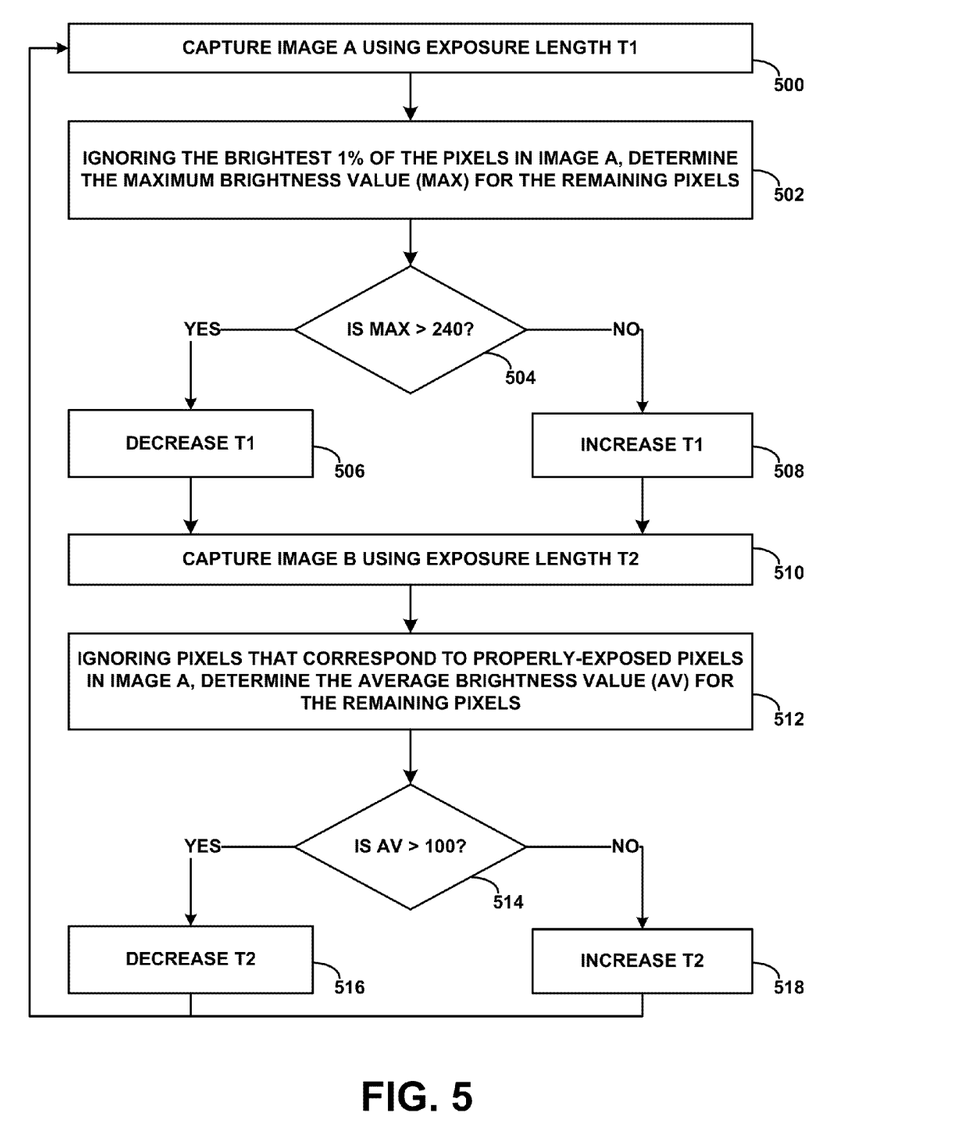
FIG. 5 is a flow chart, in accordance with an example embodiment.
Figure 6:
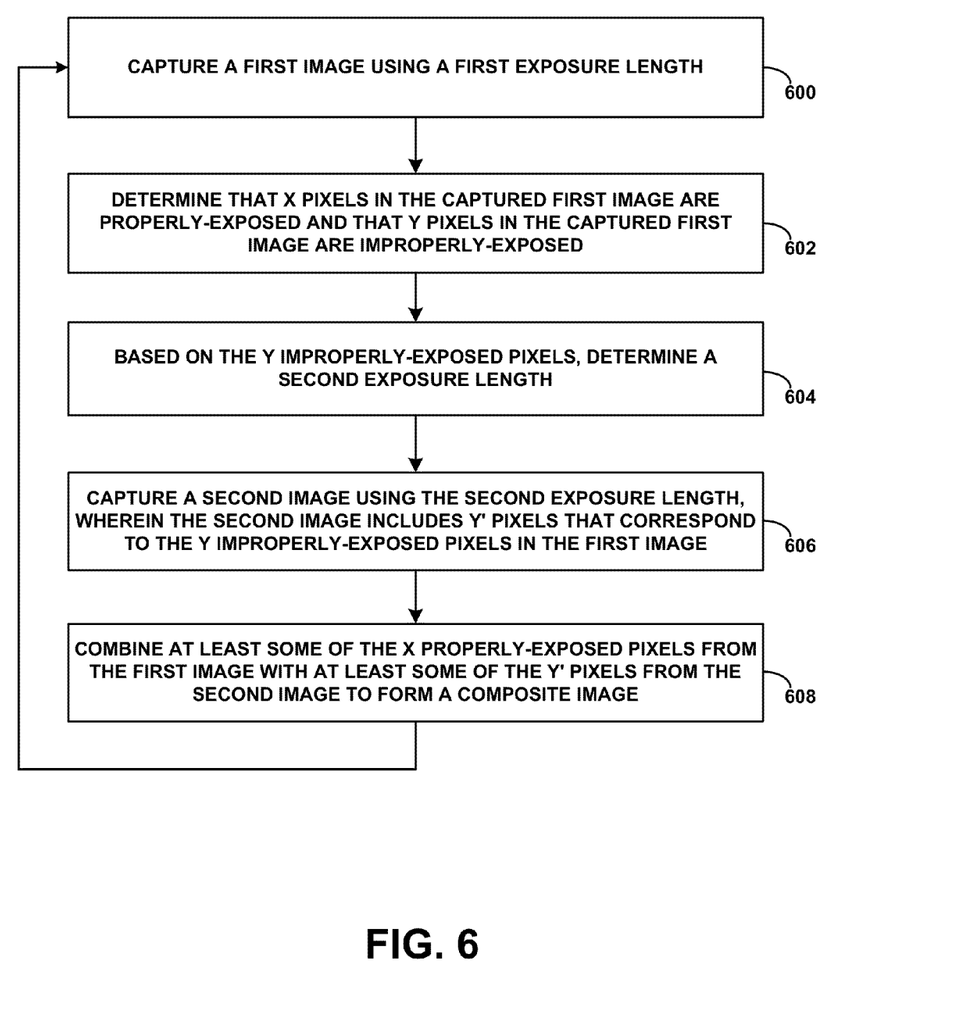
FIG. 6 is another flow chart, in accordance with an example embodiment.
Figure 7:
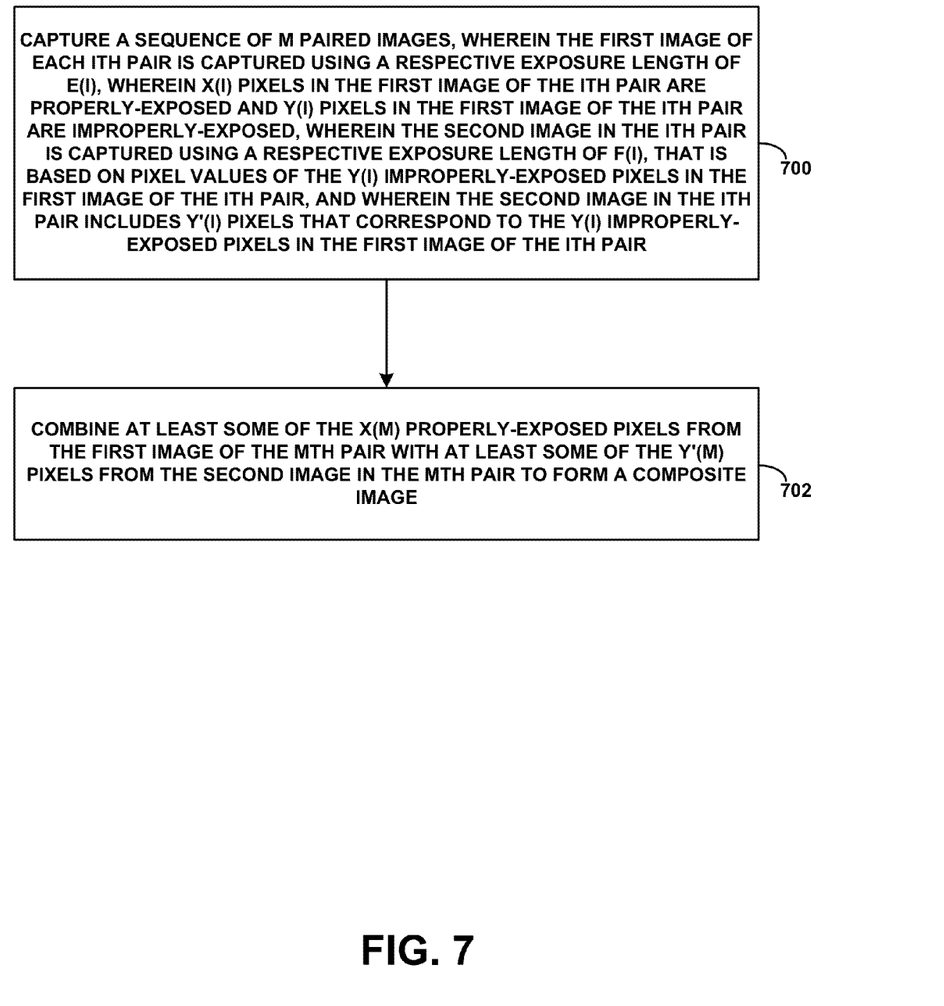
FIG. 7 is yet another flow chart, in accordance with an example embodiment.

FIG. 5-7 are flow charts of example embodiments. The steps illustrated by these flow charts may be carried out by various types of cameras and/or computing devices, such as those exemplified by digital camera device 100 and/or computing device 200. It may be possible to distribute aspects of some individual steps between multiple cameras and/or computing devices. For instance, image capture and display may occur on one device, and image processing may occur on a different device.

At step 500 of FIG. 5, an image A (e.g., part of an A sequence of images) may be captured using an exposure length T1. Determining exposure length T1 may involve a camera device or computing device estimating an exposure length that might result in a majority of the pixels in the captured image A being properly-exposed. Alternatively, T1 may be a default exposure length. As an example, exposure length T1 may take on a value in the range of 0.1-100 milliseconds. (Note that if total exposure length is considered, exposure length T1 may be multiplied by a gain, resulting in total exposure lengths of up to 1 second or more.)

At step 502, ignoring the brightest 1% of the pixels in captured image A, the maximum brightness value (MAX) of the remaining pixels in captured image A may be determined. Alternatively, a different percentage of the brightest pixels in captured image A may be ignored. For instance, this percentage may be 0.1%, 2%, 5%, 10%, and so on. Obtaining MAX may involve examining one or more pixels in captured image A to determine the brightness values of the respective pixels.

At step 504, it may be determined whether MAX is greater than 240. If MAX is greater than 240, then at step 506 exposure length T1 may be decreased. On the other hand, if MAX is not greater than 240, then at step 508 exposure length T1 may be increased. In some embodiments, threshold values other than 240 may be used. For example, any threshold value in the range 100-254 could potentially be used instead of 240.

Further, the amount that exposure length T1 is either increased or decreased may vary, and this increase or decrease may be relative or absolute. In some implementations, the increase or decrease may be determined based on the value of MAX and/or the threshold value used at step 504. For example, in these implementations, the greater the difference between MAX and the threshold value, the greater the increase or decrease of exposure length T1. Thus, for instance, if MAX is 242 and the threshold value is 240, exposure length T1 may be decreased by 5 milliseconds. But, if MAX is 250 and the threshold value is 240, exposure length T1 may be decreased by 10 milliseconds.

At step 510, an image B (e.g., part of a B sequence of images) may be captured using an exposure length T2. Determining exposure length T2 may be involve a camera device or computing device estimating an exposure length that might result in a majority of the pixels that were improperly-exposed in captured image A being properly-exposed. As an example, exposure length T2 may take on a value in the range of 0.1-100 milliseconds. In some embodiments, if the improperly exposed pixels in captured image A are overexposed, exposure length T2 may be shorter than exposure length T1, but if the if the improperly-exposed pixels in captured image A are under-exposed, exposure length T2 may be longer than exposure length T1. As noted above, a pixel is "properly-exposed" if its brightness value is within a predefined range, and a pixel is "improperly-exposed" if its brightness value falls outside of this range.

At step 512, ignoring pixels that correspond to properly-exposed pixels in captured image A, the average brightness value (AV) of the remaining pixels in captured image B may be determined.

At step 514, it may be determined whether AV is greater than 100. If AV is greater than 100, then at step 516 exposure length T2 may be decreased. On the other hand, if AV is not greater than 100, then at step 518 exposure length T2 may be increased. In some embodiments, threshold values other than 100 may be used. For example, any threshold value in the range 32-240 could potentially be used instead of 100.

The general process exemplified by steps 500-518 may be repeated some number of times. For instance, a camera component or device may carry out these steps more or less continuously while it is operational (e.g., turned on and/or receiving image data). When image capture is triggered, the final A and B images may be combined. In some situations, exposure lengths T1 and/or T2 may converge to value(s) that are deemed reasonable by the camera component or device. In these situations, the exposure lengths T1 and/or T2 may not change during one or more iterations of steps 500-518.

Further, both of the A and B algorithms can be AE algorithms, and may be the same or different algorithms. However, one or both may take into consideration what the other is doing, and may ignore at least some of the pixels that the other one is trying to properly-expose. If the A and B algorithms inter-depend on each other, then after they capture each new pair of images, it may be determined whether each pixel is better-exposed in the latest A or B image, and a mask may be made from that. Then, each algorithm masks out and ignores the pixels that it is not trying to properly-expose. In this case, steps 502 and 504 may consider the average brightness values of the remaining pixels, rather than the maximum brightness value, and the threshold using in step 504 may be different. This threshold may be dynamic, perhaps based on the amount of contrast in the captured image.

FIG. 6 is another flow chart that illustrates an example embodiment. At step 600, a first image may be captured using a first exposure length. At step 602, it may be determined that x pixels in the captured first image are properly-exposed and that y pixels in the captured first image are improperly-exposed. Each pixel in the captured first image may be associated with a pixel value inclusively between 0 and 255. The pixel value may indicate the brightness of the pixel.

Determining that the x pixels in the captured first image are properly-exposed may involve determining that the pixel value of each of the x pixels is within a particular range of pixel values, where the endpoints of the particular range of pixel values are inclusively between 16 and 240. Alternatively, the endpoint may take on other values, such as being inclusively between 32 and 224, inclusively between 96 and 240, or inclusively between 128 and 240.

In some embodiments, determining that the x pixels in the captured first image are properly-exposed may involve determining that pixel values of the x pixels are between an under-exposure threshold value and an over-exposure threshold value. Additionally, determining that the y pixels in the captured first image are improperly-exposed may involve determining that pixel values of the y pixels are above the over-exposure threshold value, where the second exposure length is shorter than the first exposure length. Alternatively, determining that the y pixels in the captured first image are improperly-exposed may involve determining that pixel values of the y pixels are below the under-exposure threshold value, where the second exposure length is longer than the first exposure length.

At step 604, based on they improperly-exposed pixels, a second exposure length may be determined. At step 606, a second image may be captured using the second exposure length. The second image may include y' pixels that correspond to the y improperly-exposed pixels in the first image. The captured first image and the captured second image may each contain n pixels, wherein x≥y and n=x+y. In some scenarios, y' may equal y. In other scenarios, y' may be different from y, possibly due to changes in the scene and/or movement of the camera.

At step 608, at least some of the x properly-exposed pixels from the first image with at least some of the y' pixels from the second image may be combined to form a composite image. This could involve positioning, in the composite image, the x properly-exposed pixels from the first image with the y' pixels from the second image based on their respective positions in the first and second images. Thus, this step may include use of one or more image alignment techniques. If the x properly-exposed pixels from the first image and the y' pixels from the second image do not account for all of the pixels in the composite image, the "gaps" could be filled in by extrapolative pixel values from surrounding pixels, such as cropping, content-aware filling, or by other mechanisms.

As indicated in FIG. 6, after step 608 this process may repeat again, beginning from step 600.

FIG. 7 is yet another flow chart that illustrates another example embodiment. At step 700, a sequence of m paired images may be captured. The first image of each ith pair (where i ranges from 1 to m inclusively) may be captured using a respective exposure length of e(i). A least x(i) pixels in the first image of the ith pair may be properly-exposed, and at least y(i) pixels in the first image of the ith pair may be improperly-exposed, The second image in the ith pair may be captured using a respective exposure length of f(i) that is based on pixel values of the y(i) improperly-exposed pixels in the first image of the ith pair. Also, the second image in the ith pair may include y'(i) pixels that correspond to the y(i) improperly-exposed pixels in the first image of the ith pair.

At step 702, at least some of the x(m) properly-exposed pixels from the first image of the mth pair may be combined with at least some of the y'(m) pixels from the second image in the mth pair to form a composite image.

In some embodiments, determining that the x(i) pixels in the first image of the ith pair are properly-exposed may involve determining that pixel values of the x(i) pixels in the first image of the ith pair are between an under-exposure threshold value and an over-exposure threshold value. Additionally, determining that the y(i) pixels in the first image of the ith pair are improperly-exposed may involve determining that the pixel values of the y(i) pixels in the first image of the ith pair are above the over-exposure threshold value, where f(i) is shorter than e(i). Alternatively, determining that the y(i) pixels in the first image of the ith pair are improperly-exposed may involve determining that the pixel values of the y(i) pixels in the first image of the ith pair are below the under-exposure threshold value, where f(i) is longer than e(i).

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
obtaining a first image that was captured using a first exposure length, wherein the first image includes a first set of two or more properly-exposed pixels and a second set of two or more improperly-exposed pixels;
determining a second exposure length based on pixel values of the second set of two or more improperly-exposed pixels in the first image;
obtaining a second image that was captured using the second exposure length, wherein the second image includes a third set of two or more pixels that correspond to the second set of two or more improperly-exposed pixels in the first image;
determining a third exposure length based on the first set of two or more properly-exposed pixels in the first image and a first target average pixel value;
obtaining a third image that was captured using the third exposure length, wherein the third image includes a fourth set of two or more properly-exposed pixels and a fifth set of two or more improperly-exposed pixels;
determining a fourth exposure length based on the fifth set of two or more improperly-exposed pixels in the third image and a second target average pixel value, wherein the second target average pixel value is different from the first target average pixel value;
obtaining a fourth image that was captured using the fourth exposure length, wherein the fourth image includes a sixth set of two or more pixels that correspond to the fifth set of two or more improperly-exposed pixels in the third image; and
forming, by a computing device, a fifth image by selecting pixels from the fourth set of properly-exposed pixels in the third image and pixels from the sixth set of two or more pixels in the fourth image that correspond to the fifth set of two or more improperly-exposed pixels in the third image.

2. The method of claim 1, wherein the captured first image and the captured second image each consist of a particular number of pixels.

3. The method of claim 1, wherein the second set of two or more improperly-exposed pixels in the first image and the third set of two or more pixels in the second image each consist of a particular number of pixels.

4. The method of claim 1, wherein each pixel is associated with a pixel value inclusively between 0 and 255, wherein pixel values of pixels in the first set of two or more properly-exposed pixels in the first image are within a particular range, and wherein endpoints of the particular range are inclusively between 96 and 240.

5. The method of claim 1, wherein the first exposure length is based on input from an ambient light sensor.

6. The method of claim 1, wherein pixel values of pixels in the first set of two or more properly-exposed pixels in the first image are between an under-exposure threshold value and an over-exposure threshold value.

7. The method of claim 6, wherein pixel values of pixels in the second set of two or more improperly-exposed pixels in the first image are above the over-exposure threshold value, and wherein the second exposure length is shorter than the first exposure length.

8. The method of claim 6, wherein pixel values of pixels in the second set of two or more improperly-exposed pixels in the first image are below the under-exposure threshold value, and wherein the second exposure length is longer than the first exposure length.

9. An article of manufacture including a non-transitory computer-readable medium, having stored thereon program instructions that, upon execution by a computing device, cause the computing device to perform operations comprising:
    obtaining a first image that was captured using a first exposure length, wherein the first image includes a first set of two or more properly-exposed pixels and a second set of two or more improperly-exposed pixels;
    determining a second exposure length based on pixel values of the second set of two or more improperly-exposed pixels of the first image;
    obtaining a second image that was captured using the second exposure length, wherein the second image includes a third set of two or more pixels that correspond to the second set of two or more improperly-exposed pixels in the first image;
    determining a third exposure length based on the first set of two or more properly-exposed pixels in the first image and a first target average pixel value;
    obtaining a third image that was captured using the third exposure length, wherein the third image includes a fourth set of two or more properly-exposed pixels and a fifth set of two or more improperly-exposed pixels;
    determining a fourth exposure length based on the fifth set of two or more improperly-exposed pixels in the third image and a second target average pixel value, wherein the second target average pixel value is different from the first target average pixel value;
    obtaining a fourth image that was captured using the fourth exposure length, wherein the fourth image includes a sixth set of two or more pixels that correspond to the fifth set of two or more improperly-exposed pixels in the third image; and
    forming a fifth image by selecting pixels from the fourth set of properly-exposed pixels in the third image and pixels from the sixth set of two or more pixels in the fourth image that correspond to the fifth set of two or more improperly-exposed pixels in the third image.

10. The article of manufacture of claim 9, wherein the captured first image and the captured second image each consist of a particular number of pixels.

11. The article of manufacture of claim 9, wherein the second set of two or more improperly-exposed pixels of the first image and the third set of two or more pixels in the second image each consist of a particular number of pixels.

12. The article of manufacture of claim 9, wherein each pixel is associated with a pixel value inclusively between 0 and 255, wherein pixel values of pixels in the first set of two or more properly-exposed pixels in the first image are within a particular range, and wherein endpoints of the particular range are inclusively between 96 and 240.

13. The article of manufacture of claim 9, wherein the first exposure length is based on input from an ambient light sensor.

14. The article of manufacture of claim 9, wherein pixel values of pixels in the first set of two or more properly-exposed pixels in the first image are between an under-exposure threshold value and an over-exposure threshold value.

15. The article of manufacture of claim 14, wherein pixel values of pixels in the second set of two or more improperly-exposed pixels in the first image are above the over-exposure threshold value, and wherein the second exposure length is shorter than the first exposure length.

16. The article of manufacture of claim 14, wherein pixel values of pixels in the second set of two or more improperly-exposed pixels in the first image are below the under-exposure threshold value, and wherein the second exposure length is longer than the first exposure length.

17. An article of manufacture including a non-transitory computer-readable medium, having stored thereon program instructions that, upon execution by a computing device, cause the computing device to perform operations comprising:
    capturing a sequence of m image pairs, wherein m is at least, wherein the first image of each ith image pair is captured using a respective exposure length of e(i), wherein i ranges from 1 to m inclusively and m is an integer, wherein x(i) pixels in the first image of the ith image pair are properly-exposed and y(i) pixels in the first image of the ith image pair are improperly-exposed, wherein the second image in the ith pair is captured using a respective exposure length of f(i) that is based on pixel values of the y(i) improperly-exposed pixels in the first image of the ith image pair, and wherein the second image in the ith image pair includes y'(i) pixels that correspond to the y(i) improperly-exposed pixels, wherein e(k) is based a target average pixel value and the properly-exposed pixels in the first image of the (k-1)th image pair when k is greater than 1; and
    forming a new image by selecting pixels from the x(m) properly-exposed pixels and pixels from the y'(m) pixels.

18. The article of manufacture of claim 17, wherein determining that the x(i) pixels are properly-exposed comprises determining that pixel values of the x(i) pixels are between an under-exposure threshold value and an over-exposure threshold value.

19. The article of manufacture of claim 18, wherein determining that the y(i) pixels are improperly-exposed comprises determining that the pixel values of the y(i) pixels are above the over-exposure threshold value, and wherein f(i) is shorter than e(i).

20. The article of manufacture of claim 18, wherein determining that the y(i) pixels are improperly-exposed comprises determining that the pixel values of the y(i) pixels are below the under-exposure threshold value, and wherein f(i) is longer than e(i).

* * * * *